United States Patent
Sollicito et al.

(10) Patent No.: US 7,865,463 B2
(45) Date of Patent: Jan. 4, 2011

(54) METHOD AND SYSTEM FOR MAINTAINING SYNCHRONIZATION BETWEEN A LOCAL DATA CACHE AND A DATA STORE

(75) Inventors: Vincent L. Sollicito, Marietta, GA (US); Edward F. Seitz, Atlanta, GA (US)

(73) Assignee: Yahoo! Inc., Sunnyvale, CA (US)

( * ) Notice: Subject to any disclaimer, the term of this patent is extended or adjusted under 35 U.S.C. 154(b) by 176 days.

(21) Appl. No.: 12/341,955

(22) Filed: Dec. 22, 2008

(65) Prior Publication Data

US 2009/0138568 A1    May 28, 2009

Related U.S. Application Data

(63) Continuation of application No. 10/651,923, filed on Aug. 29, 2003, now Pat. No. 7,496,607.

(51) Int. Cl.
    *G06F 17/30* (2006.01)
(52) U.S. Cl. .......... 707/610; 707/805; 709/203
(58) Field of Classification Search ......... 707/609, 707/610, 813, 999.001, 999.008, 999.2, 805; 709/203
    See application file for complete search history.

(56) References Cited

U.S. PATENT DOCUMENTS

| | | | |
|---|---|---|---|
| 4,663,615 A | 5/1987 | Hernandez et al. | |
| 5,331,673 A * | 7/1994 | Elko et al. | 714/43 |
| 5,544,288 A | 8/1996 | Morgan et al. | |
| 5,546,521 A | 8/1996 | Martinez | |
| 5,621,871 A | 4/1997 | Jaremko et al. | |
| 5,655,094 A | 8/1997 | Cline et al. | |
| 5,734,835 A | 3/1998 | Selker | |
| 5,754,755 A | 5/1998 | Smith, Jr. | |
| 5,801,703 A | 9/1998 | Bowden et al. | |
| 5,802,297 A * | 9/1998 | Engquist | 709/212 |
| 5,805,884 A | 9/1998 | Sitbon et al. | |
| 5,878,213 A | 3/1999 | Bittinger et al. | |
| 5,884,046 A * | 3/1999 | Antonov | 709/238 |
| 5,897,644 A | 4/1999 | Nielsen | |
| 5,933,140 A | 8/1999 | Strahorn et al. | |
| 6,016,512 A * | 1/2000 | Huitema | 709/245 |
| 6,078,935 A | 6/2000 | Nielsen | |
| 6,175,563 B1 | 1/2001 | Miloslavsky | |
| 6,216,141 B1 | 4/2001 | Straub et al. | |
| 6,230,170 B1 | 5/2001 | Zellweger et al. | |
| 6,259,445 B1 | 7/2001 | Hennum et al. | |
| 6,263,369 B1 * | 7/2001 | Sitaraman et al. | 709/225 |
| 6,272,485 B1 | 8/2001 | Sragner | |
| 6,300,947 B1 | 10/2001 | Kanevsky | |
| 6,327,608 B1 | 12/2001 | Dillingham | |

(Continued)

OTHER PUBLICATIONS

Cadiz et al. (2002). "Designing and Deploying an Information Awareness Interface," CSCW '02, New Orleans, LA, Nov. 16-20, 2002, pp. 314-323.

(Continued)

*Primary Examiner*—Cheryl Lewis

(57) ABSTRACT

A method and system for maintaining synchronization between a local data cache and a data store is disclosed. The method includes comparing first validation information and second validation information, and synchronizing first data stored in a local data cache with second data stored in a data store, if the comparison indicates that the synchronizing is needed.

16 Claims, 9 Drawing Sheets

U.S. PATENT DOCUMENTS

| | | |
|---|---|---|
| 6,405,221 B1 | 6/2002 | Levine et al. |
| 6,563,514 B1 | 5/2003 | Samar |
| 6,570,594 B1 | 5/2003 | Wagner |
| 6,584,479 B2 | 6/2003 | Chang et al. |
| 6,636,856 B2 | 10/2003 | Pasquali |
| 6,658,419 B2 | 12/2003 | Pasquali |
| 6,684,385 B1 | 1/2004 | Bailey et al. |
| 6,701,513 B1 | 3/2004 | Bailey |
| 6,744,867 B1 | 6/2004 | Chin et al. |
| 6,748,418 B1 | 6/2004 | Yoshida et al. |
| 6,750,884 B1 | 6/2004 | Steigerwald et al. |
| 6,792,436 B1 * | 9/2004 | Zhu et al. ............ 1/1 |
| 6,792,459 B2 | 9/2004 | Elnozahy et al. |
| 6,816,944 B2 | 11/2004 | Peng |
| 6,828,988 B2 | 12/2004 | Hudson et al. |
| 6,868,292 B2 | 3/2005 | Ficco et al. |
| 6,944,660 B2 | 9/2005 | Eshghi et al. |
| 6,961,929 B1 | 11/2005 | Pelegri-Llopart et al. |
| 7,051,119 B2 | 5/2006 | Shafron et al. |
| 7,076,786 B2 | 7/2006 | Burd et al. |
| 7,107,530 B2 | 9/2006 | Blakely et al. |
| 7,165,215 B2 | 1/2007 | Tunning |
| 7,194,411 B2 | 3/2007 | Slotznick et al. |
| 7,231,644 B2 | 6/2007 | Kieffer |
| 7,325,204 B2 | 1/2008 | Rogers |
| 7,343,567 B2 | 3/2008 | Mann et al. |
| 7,395,500 B2 | 7/2008 | Whittle et al. |
| 7,493,554 B2 | 2/2009 | Paila et al. |
| 7,496,607 B2 * | 2/2009 | Sollicito et al. ............ 1/1 |
| 2001/0052052 A1 * | 12/2001 | Peng ............ 711/133 |
| 2001/0056448 A1 | 12/2001 | Takeda |
| 2002/0042819 A1 | 4/2002 | Reichert et al. |
| 2002/0116407 A1 | 8/2002 | Negishi et al. |
| 2003/0058281 A1 | 3/2003 | Kepros et al. |
| 2003/0061386 A1 | 3/2003 | Brown et al. |
| 2003/0145310 A1 | 7/2003 | Thames et al. |
| 2003/0222924 A1 | 12/2003 | Baron |
| 2004/0004632 A1 | 1/2004 | Knight et al. |
| 2005/0028107 A1 | 2/2005 | Gomes et al. |
| 2007/0022155 A1 | 1/2007 | Owens et al. |
| 2007/0300244 A1 | 12/2007 | Kieffer |

OTHER PUBLICATIONS

Chang et al. (1998). "A Negotiation Architecture for Fluid Documents," UIST '98, San Francisco, CA, pp. 123-132.

Edward et al. "Reusing Internet Explorer and the WebBrowser Control: An Array of Options," Microsoft Corporation, <http://msdn.microsoft.com/library/en-us/dnwebgen/html>, Jul. 30, 1998, pp. 1-7.

Horton, I. (Aug. 2000). "Beginning Java2." Wrox Press Ltd., Birmingham, UK, pp. 602-617.

International Search Report and Written Opinion mailed Dec. 27, 2005, for PCT Application No. PCT/US04/27873, filed Aug. 25, 2004, 10 pages.

International Search Report mailed Dec. 23, 2005, for PCT patent application No. PCT/US04/27872, filed Aug. 25, 2004, 2 pages.

International Search Report mailed Nov. 1, 2005, for PCT patent application No. PCT/US04/27871, filed Aug. 25, 2004, 1 page.

Kaasinen at al. (2000). "Two Approaches to Bringing Internet Services to WAP Devices," Computer Networks 33:231-246.

Losavio, M. (Jun. 5, 1999). "Correctly Set Scrollbars' Width and Height," DevX.com Tip of the Day, pp. 1-3. Downloaded from <http//:www.devx.com/vb2themax/Tip/18285.

Maclean et al. (May 1989). "Design Rationale: The Argument Behind the Artifact," CHI '89 Proceedings, pp. 247-252.

Microsoft Corporation. (Oct. 1998). "Microsoft Office: Microsoft Outlook 2000 Product Enhancement guide," pp. 1-61.

Witt et al. (2001). "Reducing Cognitive Overhead on the World Wide Web," ACSC 2002, Melbourne, Australia, pp. 311-320.

Zellweger et al. (Apr. 2000). "The Impact of Fluid Documents on Reading and Browsing: An Observational Study," CHI 2000, The Hague, Amsterdam, Apr. 1-6, 2000, pp. 249-256.

Zellweger et al. (May 1998). "Fluid Links for Informed and Incremental Link Transitions," HyperText '98, Pittsburgh, PA, May 1998, pp. 50-57.

* cited by examiner

METHOD AND SYSTEM FOR MAINTAINING SYNCHRONIZATION BETWEEN A LOCAL DATA CACHE AND A DATA STORE

CROSS-REFERENCE TO RELATED APPLICATIONS

This application is a continuation of U.S. patent application Ser. No. 10/651,923, filed Aug. 29, 2003, entitled "Method and System for Maintaining Synchronization Between a Local Data Cache and a Data Store," the content of which is incorporated herein by reference in its entirety.

BACKGROUND OF THE INVENTION

1. Field of the Invention

This invention relates to the field of client/server architecture, and more particularly relates to a method and system for synchronizing a local data cache with a data store.

2. Description of the Related Art

With the advent of the Internet and, more importantly, the World-Wide Web (WWW, or web), users of computer systems have been afforded a wide array of functionalities, accessible from almost any location. This "portability" is provided by any number of mechanisms, including: Internet access at home and at work; public terminals; wireless technology such as cellular, IEEE 802.11 standards (often referred to as "Wi-Fi"), satellite communications and the like; and other such mechanisms. The basis for this portability is the client/server architecture in which the user is able to access information on the server from any client that is capable of accessing the server. Thus, the user is able to access, for example, a given set of programs on a server from a client in communication therewith.

The ability to access such functionality is simplified when using the web or other client/server environment, because the only required software on the client side is a client such as a web browser. For example, using a browser, the user is able to view content such as web pages generated by a given application. This allows the application to present the requisite information, as would be the case if the application were operating on the user's computer (also termed "on the desktop"), without actually having to install that application on the computer. Such a "generic client" approach, obviously, lends itself to the portability aspect that makes such a paradigm so attractive.

However, generating and serving content, especially which needs to be populated with data from other sources, is often quite slow, particularly when compared to desktop applications. As a result, users of such systems are often found to prefer desktop applications over web-based applications. Certainly, the greater the delay in operations experienced with a web-based application, the more preferable a user would find using a corresponding desktop application. Generally the greater the delay in operations, the stronger the user's preference for the desktop application.

This is especially true of applications and functions thereof, in which the data would be immediately available, as in the case of a desktop application. For example, many desktop applications automatically fill certain data-entry fields on various of their screens. This is a convenient and time saving feature that most users find desirable. However, when providing such functionality in a web-based application, some amount of delay in filling such fields is inevitable, as a result of the delays inherent in transporting information over the network. If the delays are substantial, the user's experience in using the given application is negatively impacted.

One solution is keeping the data available using a "cookie," which is a message sent to a web browser by a web server, which the browser stores in, for example, a text file. Typically, information from such a cookie is then sent back to the server in the form of a message, each time the browser requests a page from the server, to identify the user and, potentially, to give the server information regarding the user. As will be appreciated, cookies can also be used to store information on a client computer. However, such an approach must contend with a number of shortcomings. Moreover, leaving such information on a public computer may not be acceptable, and so require the user to delete such cookies after each use of the application.

Another approach is to simply download the entire store of requisite data at the time the content, such as a web page, is downloaded (served) to the client. This would, typically, include the entire store of data that might be used by/presented to the user. However, this must be done each time any such information is needed, consuming valuable network resources and, as noted earlier with regard to such delays, negatively impacting the user's experience. As will also be appreciated, sending the full complement of data can also slow, or even crash, the browser software running on the client, once again resulting in a poor user experience. Thus, the poor performance typically associated with web-based solutions stands as an obstacle to adoption.

What is therefore needed is a technique that allows a web-based application to provide the functionality of a desktop application. Such functionality should be provided to the user in a fast and efficient manner, while offering the advantages of web-based applications, such as portability, uniformity and the like.

SUMMARY

The present invention provides a method and system that addresses the foregoing limitations by employing a local data cache that can be efficiently and effectively maintained by a client that allows quick and efficient access to server-based information. Moreover, by minimizing the transfer of information over a network employing the present invention this performance is provided without adversely impacting network resources or performance. The present invention achieves this by maintaining local validation information, and comparing that local validation information and current validation information. In one embodiment, the local data cache and local validation information are maintained at the client, while the current validation information is received at the client, from the server serving content to the client.

If the comparison indicates that the client should request the requisite data, the local data cache does not exist, or some other consideration indicates that such a request should be made, synchronization is performed. In one embodiment, the client sends synchronization information to a server. This server can be, for example, either the server serving content, or a dedicated server, such as a data server. The synchronization information can be configured to either force the server to send the requisite data, or to indicate that the server should make a determination as to whether or not the requisite data should be sent.

Thus, synchronization of the data stored in the local data cache with that stored in a data store can be controlled by the server providing the content, the client, or the server serving the requisite data, which can, in fact, be the same server as that providing the content. By implementing such a methodology, then, a client application, such as a browser, is able to access the data necessary to present a web-based application's data, and so, content, in a timely and efficient manner.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawings.

The use of the same reference symbols in different drawings indicates similar or identical items.

DETAILED DESCRIPTION OF THE INVENTION

Figure 1:
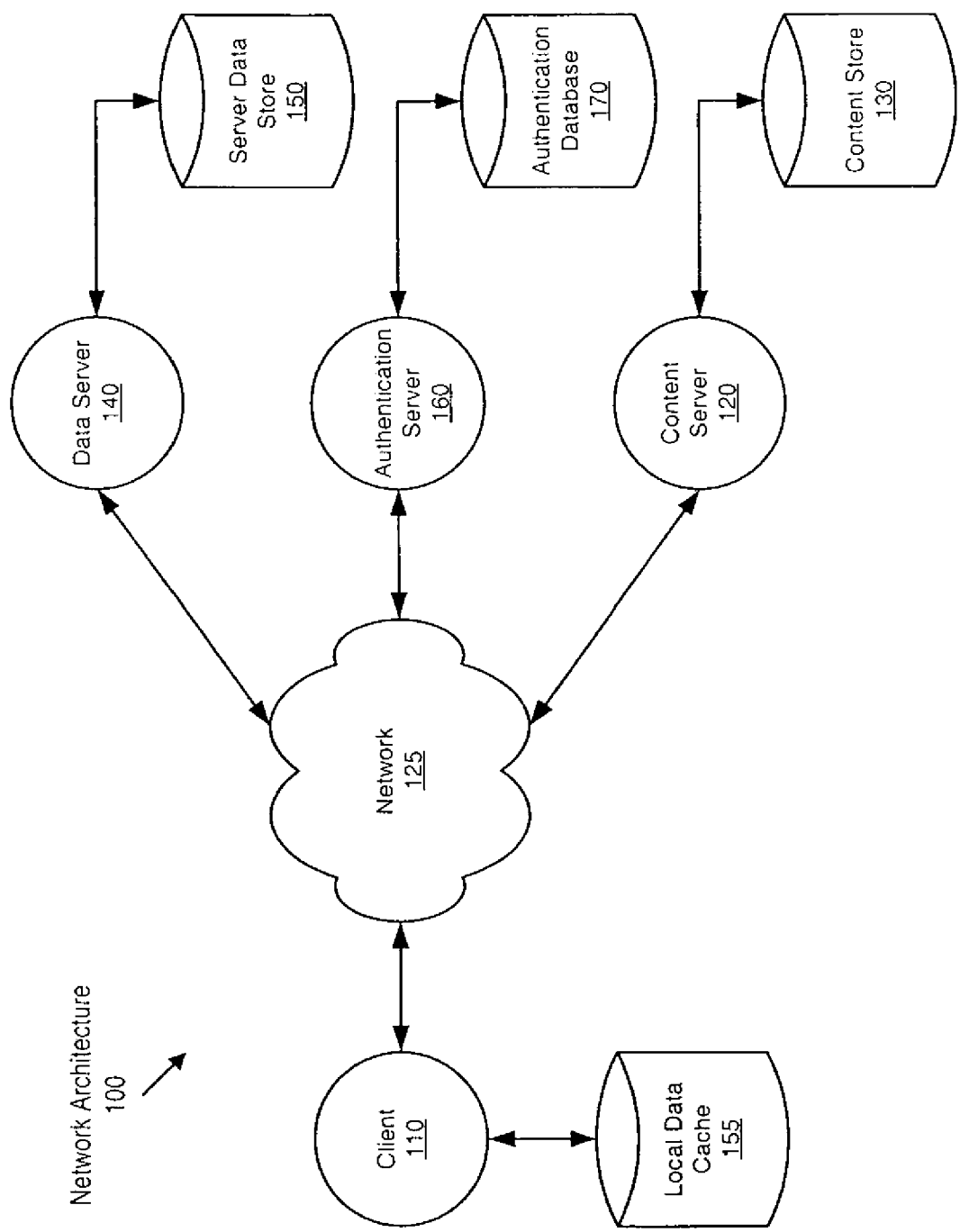
FIG. 1 is a block diagram illustrating a network architecture according to embodiments of the present invention.

The following is intended to provide a detailed description of an example of the invention and should not be taken to be limiting of the invention itself. Rather, any number of variations may fall within the scope of the invention which is defined in the claims following the description.

Introduction

The present invention provides a method and system that provides for the local maintenance of a user's data, in a manner that allows a web-based application to access and present server-based data on a client system in a timely and efficient manner. Moreover, such presentation is accomplished without adversely impacting network resources.

The present invention is able to provide such advantages through the use of a client/server architecture that includes a client-side data store, which is referred to herein as a local data cache, and a server-side data store. A local data cache according to embodiments of the present invention is not updated transactionally, in the manner of a database (i.e., in an ongoing, dynamic and record-by-record manner), but is updated by copying the requisite data in its entirety from the server's data store, replacing that in the local data cache (e.g., the deletion and subsequent replacement of a file containing the local data cache). It will be appreciated that in copying the data in its entirety, the replacement of one or more parts of a multi-part local data cache is contemplated. In such a scenario, a multi-part local data cache is implemented as a number of files, one file per part, for example, in which case one or more parts of such a multi-part local data cache can be replaced.

Such an approach simplifies the structure of the local data cache, as well as the client and server software. It also speeds operation of reading the local data cache, typically the most common task in such a system, and reduces the demands on client systems by not requiring the presence of database software on such systems. It will also be appreciated that, while the approach described herein provides advantages with regard to performance, the format of the local data cache and the process by which the local data cache is kept synchronized with the server-side data store are not necessarily dependent upon one another.

Synchronization is maintained between the local data cache and the server-side database through the maintenance of local validation information and comparison of that local validation information and current validation information. Local validation information is typically maintained on the client, in the client's local data cache, although such information can be maintained on the server. Conversely, current validation information is typically maintained on the server and sent to the client. Thus, comparison of local validation information and current validation information will typically be performed by the client, in determining whether to request a refresh of its local data cache. However, in the case where the local validation information is maintained on the server, or the server receives the local validation information from the client, the comparison can be performed on the server.

If the comparison indicates that the client should request the requisite data, or the local data cache does not exist, or some other consideration indicates that such a request should be made, the client sends synchronization information to a server. This server, as will be appreciated, can be the server from which content is requested, or a dedicated server, such as a data server. This synchronization information can be configured to either force the server to send the requisite data, or to indicate that the server should make a determination as to whether or not the requisite data should be sent, based on information in the synchronization information and/or other information available to the server.

Thus, synchronization of the data stored in the local data cache with that stored in a data store can be controlled by the server providing the content, the client, or the server serving the requisite data. The server providing the content can control synchronization by sending current validation information that forces synchronization, or, if the server performs the aforementioned comparison, by indicating that the result thereof indicates that synchronization should occur. Similarly, the client can control synchronization by sending synchronization information that forces synchronization. Ultimately, the server providing the data can control synchronization by sending, or not sending, the requisite data. As will be appreciated, the server providing the content and that serving the requisite data can, in fact, be one in the same. By implementing such a methodology, then, a client application, such as a browser, is able to access the data necessary to present a web-based application's content in a timely and efficient manner, from any client that has access to the requisite server(s).

In order to allow a user to employ the present invention using, for example, a public computer, it is preferable to protect the data. This can be achieved by encrypting the data stored on the public computer. The question with regard to the encryption of the data, then, is encryption key management. The inventors arrived at the conclusion that the preferred solution is to generate an encryption key on a server in the present invention's system, such as the content server or data server, and provide that to the client. The client is then able to decrypt the data. To improve security, the client discards the decryption key, although this implies that a key will be needed to be sent to access the data. This typically occurs on a per-session basis, which involves a minimal amount of overhead, in fact.

However, the information used by the server to generate the key may have changed between the time that the data was encrypted and the time the user requests the decryption key. In order to avoid the server sending a key that will not decrypt the local data cache, and the client needlessly requesting the download of data already stored in the local data cache, the present invention implements the notion of validation information. The server can send current validation information to the client, which the client can compare with local validation information. If the comparison indicates that the information used to encrypt the local data cache in its current state has changed, the client can request that the server download the requisite data, knowing that the decryption key the server would have sent would not have decrypted the data encrypted in the local data cache. If the comparison indicates that the information used to encrypt the local data cache has not changed, the client need only request the decryption key from the server, thereby minimizing the impact on the network's resources.

Example of an Apparatus for the Maintenance of a Local Data Cache

FIG. 1 is a block diagram illustrating a network architecture 100 according to embodiments of the present invention. Within network architecture 100, a client 110 accesses a content server 120 via a network 125, in order to receive web page content from content server 120. Content server 120 serves web page content to client 110 by accessing a content store 130. Content store can be, for example, a web page content store, in which content representing web pages is stored. This web page content can include, for example, fields requiring data of various types and formats. In certain situations, then, the web page content served by content server 120 is populated with such data. In these situations, the requisite data can be provided by content server 120, or served to client 110 by a data server 140, via network 125. In the latter case, as depicted in FIG. 1, data server 140 serves data to client 110 by accessing a server data store 150. Client 110 caches the data served by data server 140 in a local data cache 155.

In one embodiment, local data cache 155 is stored in a file, in a directory structure of client 110. Local data cache 155 is then deleted by deleting the file. It will be appreciated that, in such a scenario, a multi-part local data cache can be implemented, for example, through the use of multiple files, one file per local data cache part. Moreover, this extends to the situation in which multiple local data caches reside on a given client, in which case each of these local data caches can be implemented as a file, and one or more of these files replaced, as necessary. In that case, each sub-section of a user's local data cache can be separately refreshed. This might be the case, for example, where the data stored in each sub-section is used to support a different application.

Typically, each user has a local data cache 155 that stores their respective data, in a file in a directory structure having that user as its owner. For example, in the manner that web content is stored when using a web browser, a local data cache's file can be stored in a user's private directory, providing a standard location for the file(s) and, potentially, preventing access to the file(s) by other users. Thus, in the case where multiple users employ the present invention on a given client, each user will have their own local data cache, and so a corresponding file.

Alternatively, a single local data cache can support a class of users, a user group or some other grouping of users. Using a file with appropriate permissions as the local data cache provides the ability to allow multiple users, such as the members of a user group, to be supported using a single local data cache. In such a case, the members have shared access to the directory structure containing the shared local data cache file. This is in contrast to a multi-part local data cache used by a single user, in which case, for example, the multiple files will have the same permissions (for the given user) and prevent others from accessing those files.

An alternative is to allow a user to have certain portions of their local data cache as private, and other portions as public. In an implementation employing multiple files, such an arrangement can be fashioned through the use of file permissions, and appropriately configuring a system according to the present invention. Of course, the foregoing assumes that access to the data by other users in the group is acceptable.

In order to secure access to content server 120 and data server 140, and so, content store 130 and server data store 150, an authentication server 160 is provided. Authentication server 160 authenticates a user logging in to client 110 via communications with client 110 over network 125, using authentication information stored in an authentication database 170. Thus, a user logging in to content server 120 is authenticated by authentication server 160, and so gains access to content server 120, as well as data server 140, upon acceptance of the user's login information. Content server 120 and data server 140 also are provided access to the user's authentication information via communications with authentication server 160.

It will be appreciated that the functions depicted as being separate in FIG. 1, including the serving of content, serving of data, and authentication, need not, in fact, be provided by separate computing entities. For example, the provision of content and data can be handled by a single server, from a single data store. Moreover, the messages passed between the servers and the client can be consolidated, and simply occur between the client and, for example, a single server providing all of the requisite services. It will also be appreciated that the various servers and data stores depicted in FIG. 1 are thus depicted for purposes of explanation. Each data store can be considered an integral part of its respective server, without loss of generality.

In operation, the data cached in local data cache 155 is maintained by providing client 110 validation information, such as current validation information, with which client 110 can compare validation information stored in local data cache 155, for example, local validation information. Typically, current validation information is provided along with content that is already being requested by client 110. This validation information conveys the state of data regarding the user, such as data held remotely in server data store 150, and so informs client 110 of changes to such data. It will be appreciated that such validation information can, in fact, be based on any relevant data, whether stored remotely or locally, having a bearing on the state of the local data cache.

To maintain the local data cache in synchronization with this remote data, or information related to that remote data, the server providing the content generates the current validation information from information available to that server. For example, content server 120 can be designed to generate current validation information from authentication information made available by authentication server 160. Alternatively, information regarding changes to the content in content store 130 or data in server data store 150 can be used to generate the current validation information. As will be appreciated, other information can form the basis for generating the current validation information.

Once client 110 receives the current validation information, client 110 compares its local validation information with the current validation information in order to determine whether local data cache 155 requires synchronization with the remote data store. If client 110 determines that synchronization is required, or there is another basis for sending a request, such as the possibility that the data in local data cache 155 is stale, client 110 sends synchronization information to the data server.

The data server receives and analyzes this synchronization information in order to determine whether data from its data store should be returned to client 110, for subsequent storage in local data cache 155. So, for example, if the comparison of validation information indicates that synchronization information should be sent to the data server, the client sends the synchronization information to the data server.

Having received the synchronization information, the data server can, for example, either: (1) send the requisite data to the client, for example, because the comparison performed by the client indicates that the client should indicate an unequivocal need for the data to the data server, such as in the synchronization information sent to the data server; or (2) make a determination as to whether or not data should be sent to the client, based on information in the synchronization information. As will be appreciated, in the alternative, the information used by the data server in conjunction with the synchronization information to determine whether to send data can, instead, be sent to the client, allowing the client to make the determination as to whether to download data from the data server's server data store.

However, if client 110 determines that synchronization is not required, based on the comparison of the local and current validation information, no request need be sent to data server 140. This assumes that no other motivations exist to make such a request. This avoids the delay involved in making such a request and consumption of network resources that would otherwise result from such an operation. Moreover, because this decision is based on information provided during an operation that would occur in any event (the requesting and serving of content), the decision is able to be made without any significant impact on network resources.

In allowing the data server to make a determination as to whether or not data should be sent to the client (i.e., whether synchronization is required), other synchronization criteria can be implemented, in addition to the transfer of validation information. For example, a last-modified timestamp, as depicted subsequently, can be employed to allow a determination as to the timeliness of the data stored in local data cache 155. Versioning information, as also depicted subsequently, can be included with the data, in order to allow a determination as to whether formats have changed, for example, as a result of software upgrades. Such features are described in greater detail in connection with FIG. 2.

While depicted in a client-centric manner in FIG. 1, it will be appreciated that local data cache 155 can reside on one of the servers, such as content server 120. In that case, a local data cache can be maintained for each client accessing content server 120. Separately, the comparison of local validation information and current validation information can be performed by one of the servers, such as content server 120. In that case, client 110 provides its local validation information to content server 120, which then performs the comparison, and provides the results thereof to client 110.

It will also be appreciated that both local and current validation information can be maintained on one of the servers, such as content server 120, which can then generate the synchronization information resulting from the comparison of the local and current validation information, and send this information directly to another of the servers, such as data server 140, thereby avoiding the involvement of client 110 in the determination as to the need for synchronization. Moreover, if local data cache 155 on one of the servers, such as content server 120, the local data cache for a given client can be maintained without any involvement of that client in the maintenance of its local data cache, or the synchronization process.

Figure 2:
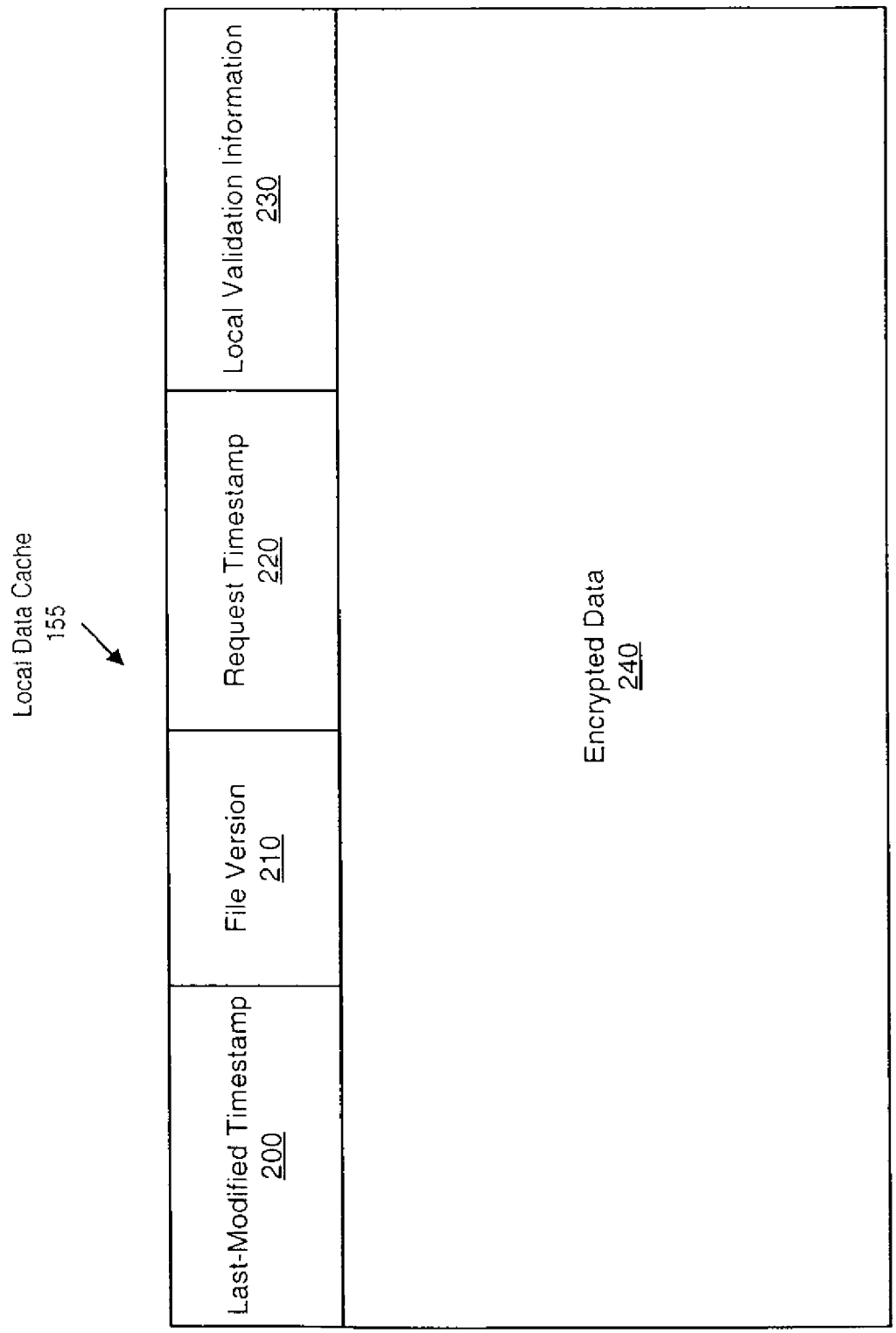
FIG. 2 is a block diagram illustrating an example layout of a local data cache according to embodiments of the present invention.

FIG. 2 is a block diagram illustrating an example layout of a local data cache such as local data cache 155. In this example, local data cache 155 includes a last-modified timestamp 200, a file version 210, a request timestamp 220, local validation information 230 (e.g., a KeyID) and encrypted data 240. Last-modified timestamp 200 includes information indicating the last point in time at which the data encrypted as encrypted data 240 was modified. This allows a server, such as data server 140, to determine if the data in its data store, such as server data store 150, is more recent than the client's local data cache, in the case where the server receives a request from the client. File version 210, as noted, allows client 110 to indicate the version of the file format of the data stored within local data cache 155. Request timestamp 220 indicates the last point in time at which data was requested from the data server, such as data server 140. This allows the data server to determine if the last data set downloaded to the client was downloaded during a time period in which such downloads were corrupted for some reason. Local validation information 230 is the information originally sent with the data stored in local data cache 155. Encrypted data 240, in this example, is the data received from the data server, once that data has been encrypted by the client using the encryption key provided by the data server.

An Example Process for the Maintenance of a Local Data Cache

Figure 3:
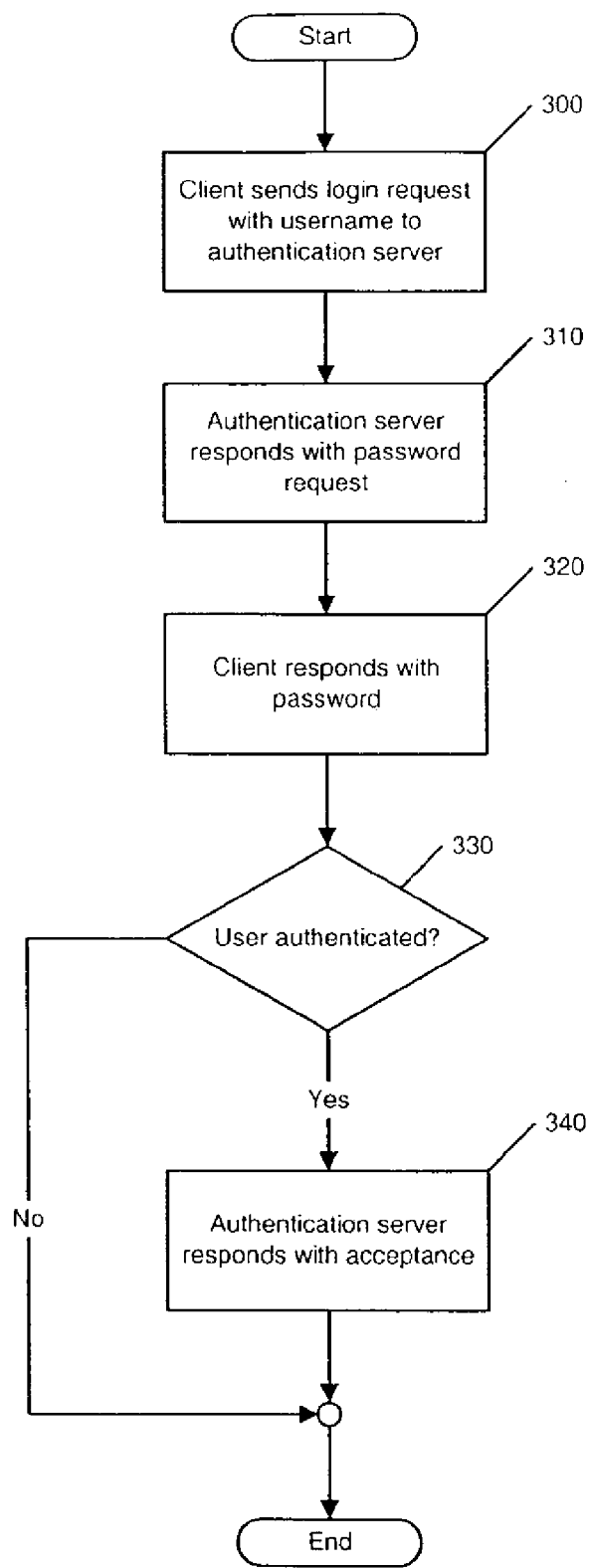
FIG. 3 is a flow diagram illustrating an example of an authentication process according to embodiments of the present invention.

FIG. 3 is a flow diagram illustrating an example of an authentication process according to embodiments of the present invention. The process of authentication of a user in a network architecture such as network architecture 100 begins with the client sending a login request with a username from the client to an authentication server (step 300). Having received the user's username, the authentication server responds with a password request (step 310). The client, having received this password request, prompts the user for the user's password. The user enters their password, and the client responds to the authentication server with this password (step 320). A determination is then made by the authentication server as to whether the user can be authenticated (step 330). If the user cannot be authenticated, access is denied to the user and the process of authentication is complete. It should be noted that, typically, a user may be allowed to repeat this authentication procedure some number of times, in order to allow a user to re-enter their username and password, such as in the case where the user mis-types this information or makes some other mistake.

If the user is authenticated, the authentication server responds by accepting the user's login (step 360). In a network architecture such as network architecture 100, authentication server 160 is capable of communicating with content server 120 and data server 140 via network 125, so that authentication server 160 can provide a user's authentication information to content server 120 and data server 140. This allows a context to be established, in which content server 120 and data server 140 can provide information to client 110 that is appropriate for the given user. The use of authentication information allows content server 120 and data server 140 to uniquely identify the user, and so react appropriately to requests from the user, such as controlling access to web content, the data used to populate certain web pages, and the like.

It will be appreciated that, while such a user can be a person, the user can alternatively be a member of a user group, or some other logical association of users. For example, such a group might represent the members of an engineering team, a club, a governmental department or some other such logical association of users. Moreover, the local data cache described herein, while capable of supporting a single person's data, can also be employed in supporting the data of such a group, allowing the members of the group common access to the data stored in such a local data cache. Typically, however, a local data cache will be used to maintain a single user's data, and, through the use of encryption or similar measures, prevent access thereto by other users and provide for the separate maintenance of the users' data. Conversely, multiple local data caches can be used to support a single user, if such divisions in the user's data is appropriate, as noted earlier.

Content server 120, in certain embodiments, is capable of generating current validation information for forwarding to client 110 using authentication information from authentication server 160. In doing so, changes to the authentication information can be detected in changes to the validation information, such as between the current validation information and local validation information. For example, a change in authentication information (e.g., username (u) and password (p)) can be related to the encryption/decryption key generated and the KeyID in the following manner. One can suppose two functions $$g(u, p)$$

and $$h(u, p)$$

such that $$g(u, p) \mathrel{!=} h(u, p)$$

for a given pair of values u and p. Further, $$g(u1, p1) \mathrel{!=} g(u2, p2), \text{ if } ((u1 \mathrel{!=} u2) \text{ or } (p1 \mathrel{!=} p2))$$

and $$h(u1, p1) \mathrel{!=} h(u2, p2), \text{ if } ((u1 \mathrel{!=} u2) \text{ or } (p1 \mathrel{!=} p2))$$

If one then calculates the key as g(u, p) and the KeyID as h(u, p), it can be seen that changes in one or both of u and/or p results in some sort of change being reflected in both the key and KeyID. Without knowledge of the specific implementation of g and h, one can know that a change in the user's username or password will change both key and KeyID, and so, a change in KeyID implies a change in key. It is thus possible for the client to receive the current KeyID (current validation information), and, using its local KeyID (local validation information), determine if the key that will be sent, will indeed decrypt the data in its local data cache. Alternatively, this indicates that the client needs to request the requisite data, as well as an encryption key, from the server. Also, as noted, such restrictions may also be implemented directly via one or both of content server 120 and data server 140.

Moreover, in a network architecture according to the present invention, a content server such as content server 120 need not rely on authentication server 160 for the information used by content server 120 in generating the current validation information that is sent to client 110. Content server 120 can use any information available that might be available, such as a historical record of downloads to client 110, knowledge regarding the age of information in the various data stores, such as server data store 150 or content store 130, in whole or in part, or other such information, to generate current validation information.

As noted, FIG. 3 depicts a flow diagram illustrating a process according to an embodiment of the present invention. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules, such as software, firmware or hardware modules. For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by, for example, a software module) or a portion of a module or a computer system user. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media; optical storage media such as compact disk media (such as CD-ROM, CD-R, CD-RW and the like), digital video disk (DVD) storage media and the like; nonvolatile memory storage memory, including semiconductor-based memory units such as FLASH memory, EEPROM, EPROM, ROM, application specific integrated circuits and the like; volatile storage media including registers, buffers or caches, main memory, RAM and the like; and data transmission media, including computer network, point-to-point telecommunication, carrier wave transmission media and the like. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Figure 4:
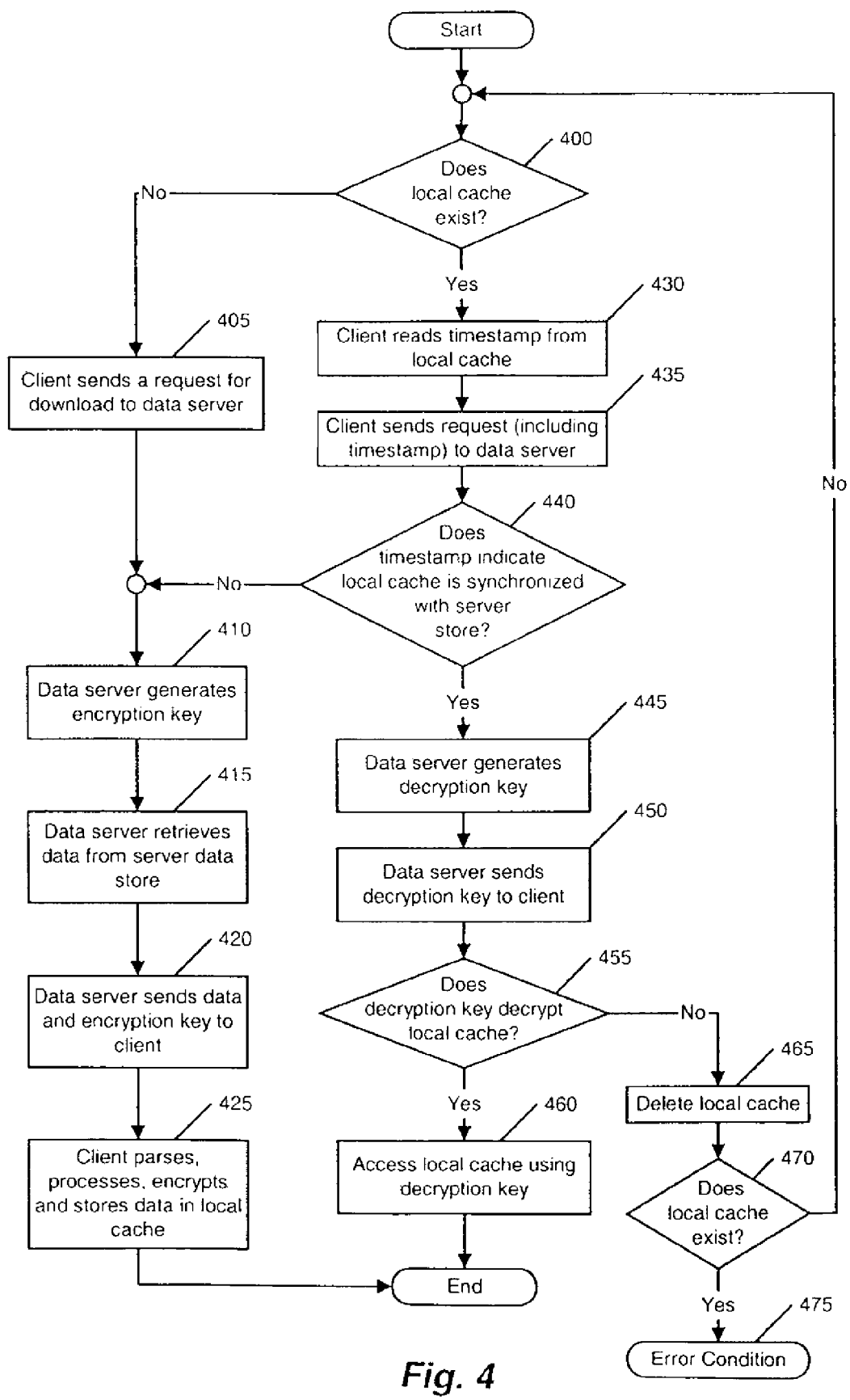
FIG. 4 is a flow diagram illustrating an example of a data retrieval process according to embodiments of the present invention.

FIG. 4 is flow diagram illustrating an example of a data retrieval process performed by a client in communication with a data server according to embodiments of the present invention. The process begins with a determination as to whether a local data cache exists on the client (step 400). If a local data cache does not exist, the client sends a request for a download to the data server (step 405). By requesting a download, the client requests that the data server provide data from its server data store. The data thus downloaded can be constructed based on any number of criteria, such as the intended use of the data, the user's present context, and/or other criteria.

In turn, having received the client's request, the data server generates an encryption key (step 410). Next, the data server retrieves the requisite data from the data server's data store (step 415). The data server then sends this data, as well as the encryption key generated by the data server, to the client (step 420). Having received the data and encryption key, the client parses, processes, encrypts and stores the data in its local data cache (step 425). It will be noted that, having received the data in an unencrypted form, the client is able to immediately use this copy of the data in populating the given fields of the web pages served by the content server, and presenting those pages to the user. By keeping the data thus received available for immediate use, the client is able to provide the fastest possible presentation of the data to the user, while also maintaining the local data cache, via the encryption of the data, and the subsequent storage of the now-encrypted data.

If the local data cache exists (step 400), the client reads the local data cache's timestamp, such as last-modified timestamp 200 (step 430). The client then sends a request for the requisite data, including the timestamp just read (or other such synchronization information), to the data server (step 435). The data server receives this request, and makes a determination as to whether the timestamp received indicates that the local data cache of the client is synchronized with the data server's server data store (step 440). It should also be noted here that a request timestamp, such as request timestamp 220, can also be sent to the data server for analysis, to ensure that the client has not cached corrupted data, per the discussion in connection with FIG. 2. If the timestamp received indicates that the local data cache is not synchronized with the server data store, the data server can conclude that new data needs to be sent to the client, and so proceeds as follows. As before, the data server generates an encryption key (step 410). Next, the data server retrieves the requisite data from the data server's data store (step 415). The data server then sends the data and encryption key to the client (step 420). As before, the client parses, processes, encrypts and stores the data in its local data cache, performing the processing associated with those actions in the manner described previously (step 425).

If the timestamp received from the client indicates that the client's local data cache is synchronized with the server data store (step 440), the data server generates a decryption key for use by the client in decrypting the encrypted data within its local data cache (step 445). The data server then sends this decryption key to the client (step 450). Having received this decryption key, the client then attempts to decrypt the data within its local data cache using this decryption key, thus making a determination as to whether the decryption key will, in fact, decrypt the local data cache (step 455). If the decryption key received from the data server decrypts the local data cache, the client accesses the local data cache, and proceeds with displaying the requisite data as part of the web page received from the content server (step 460). However, if the decryption key does not decrypt the local data cache, the client deletes the local data cache (step 465). The client then makes a determination as to whether the local data cache was successfully deleted (step 470). If the local data cache was not successfully deleted, an error condition is indicated (step 475).

If the local data cache was successfully deleted, the process begins anew with a determination as to the existence of the local data cache (step 400). Given that the local data cache has been successfully deleted, the process continues with the client sending a request for a download to the data server (step 405). As before, the data server generates an encryption key (step 410) and retrieves the requisite data from its server data store (step 415). Next, the data server sends this information to the client (step 420). The client then parses, processes, encrypts and stores the data in its local data cache in the manner previously described (step 425). As before, the unencrypted data remains available for use in populating the web page(s) received from the content server.

Given that efficiency of such a process is a concern, the amount of data transferred should be minimized in order to reduce the impact of such transactions on the network. That being the case, a data server according to the present invention can be configured to download only a subset of the information stored in the data store, for reasons of efficiency. For example, records within the data store may contain a variety of fields, only some of which are of interest. In such a scenario, rather than download the entire data store, a data server according to the present invention can be configured to download only those fields which are of interest. Downloading a subset of the data store in this manner can be expected to require significantly less time than downloading the entire data store.

The foregoing data reduction can be performed on the basis of sending only certain fields, only certain fields of only those records that have changed, or by some other criteria. Moreover, while a standard "web programming language" such as XML can be used to transfer the requisite data, the inventors determined that a more efficient format in which to transfer this data is as tab-delimited data. This is because the tab-delimited data was found to translate into significantly less data being transferred. It will be appreciated, however, that no matter how the subset is fashioned, the data downloaded to replace the existing local data cache will replace that data in the local data cache.

Even in light of such optimizations, however, in the instance in which the requested decryption key sent by the data server will not decrypt the client's local data cache, the process depicted in FIG. 4 suffers from the inefficiency of the client making a request for the decryption key from the data server (steps 435, 445 and 450), determining that the decryption key sent by the data server will not decrypt the client's local data cache (steps 455, 465, 470 and 475), and then having to request the data anew (steps 400 and 405). Given that such an event would result in, for example, an increased number of server transactions, increased network traffic, slower response time, and, ultimately, the user waiting longer for the client to populate the given web page, a solution that avoids such undesirable duplication of effort is desirable. Such a solution is described in connection with FIGS. 5, 6 and 7.

Figure 5:
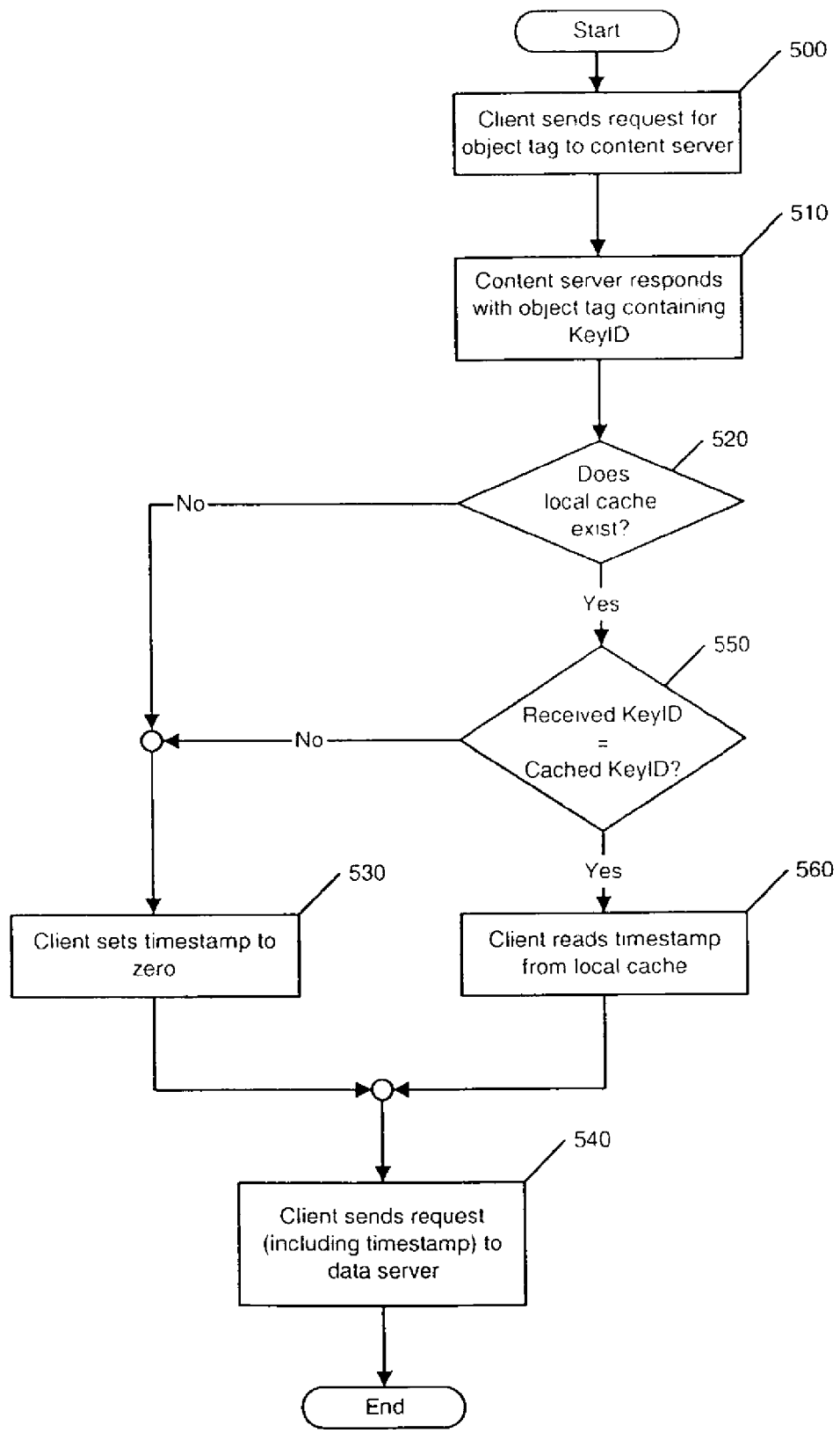
FIG. 5 is a flow diagram illustrating an example of a client requesting content from a content server and data from a data server, according to embodiments of the present invention.

FIG. 5 is flow diagram illustrating an example of a client requesting content from a content server and data from a data server according to embodiments of the present invention. In the process now described, as well as in related FIGS. 6 and 7, the need to avoid requesting a stale decryption key from the data server is met through the use of validation information. In the present example, such validation information is a KeyID. Through the use of a KeyID, the client is able to determine whether the decryption key that will be sent by the data server, will actually decrypt the encrypted data in the client's local data cache, prior to the data server's sending the decryption key. That being the case, the client can avoid requesting the decryption key, only to find that the decryption key thus sent will not decrypt the encrypted data in the client's local data cache, and can directly proceed to requesting that the data server send the requisite data and associated encryption key.

The process begins with the client sending a request for content, such as a web page with initialization parameters, to a content server (step 500). The content server responds with the requested content. In the present invention, this content (e.g., an object tag) contains current validation information (e.g., in a ParamTag) that allows the client to determine whether information regarding the local data cache has changed (step 510). Such information can be implemented, for example, in the form of a KeyID, which can be formed, for example, using the user's authentication information made available from the authentication server. In this example, the authentication information is used to generate both the encryption and decryption keys for the client's local data cache, and the KeyID. This includes both the information stored as validation information 230 in local data cache 155, and that generated by content server 120. In doing so, changes to this authentication information will result in changes to the KeyIDs, as well as to the encryption and decryptions keys.

The client then makes a determination as to the existence of a local data cache containing the desired data (step 520). If a local data cache does not exist, the client sets the timestamp information sent to the data server, to 0, indicating that the data server should respond with the requisite data and associated (new) encryption key (step 530). The client then sends this request, including the timestamp (now set to 0), to the data server (step 540). It will be noted that upon receiving a request from the client with a timestamp of 0, the data server will take this to mean that the client's local data cache is of a maximum age, and so should be replaced, which is the desired result.

If a local data cache exists on the client (step 520), a determination is made by the client as to whether the current validation information (e.g., KeyID) received from the content server matches that stored in the local data cache (step 550). If the received KeyID does not match the cached KeyID, the client again sends a request to the data server with a timestamp, for example, with a value of zero, indicating that the data server should send the requisite data, and thereby elicits the data server to send the requisite data to the client (steps 530 and 540). However, if the KeyID received from the content server matches the KeyID in the client's local data cache, the client reads the timestamp from the local data cache (step 560).

As before, the client then sends its request, including this timestamp, to the data server (step 540). At this point, the timestamp sent to the data server is the actual timestamp of the client's local data cache, thereby allowing the data server to determine whether the data stored in the client's local data cache is stale in comparison to the data stored in the data server's server data store. Such determinations by the data server are discussed subsequently in greater detail in connection with FIG. 6.

It will be appreciated that, in the present example, the posited timestamp is capable of serving multiple roles as the synchronization information. In one instance, by setting the timestamp to the timestamp of the local data cache, the data server can determine whether or not the information in the local data cache is stale. Alternatively, if the local data cache does not exist or the validation information indicates that new data should be cached by the client, the client can set to the timestamp to a value that forces the data server to send the requisite data.

Embodiments of the present invention, in fact, allow a substantial amount of control over which of the network entities involved causes the download of data to the client, if any. This is achieved through the use of synchronization information and validation information. Thus, the client can be made to control whether the transfer occurs by sending synchronization information that forces the data server to send the requisite data. Alternatively, the content server can be made to control the transfer. This can be achieved through the content server's sending validation information that forces the client to send synchronization information that, in turn, forces the data server to send the requisite data. In another alternative, the data server can be made to control the transfer. In this case, the data server simply makes a decision as to whether or not to send the data. In the typical case, however, the comparison of local and current validation information leads to the generation of appropriate synchronization information; the decision as to whether to synchronize the local data cache is then based on this synchronization information, allowing the data server to reach its decision based on the current state of the local data cache and current authentication information.

Figure 6:
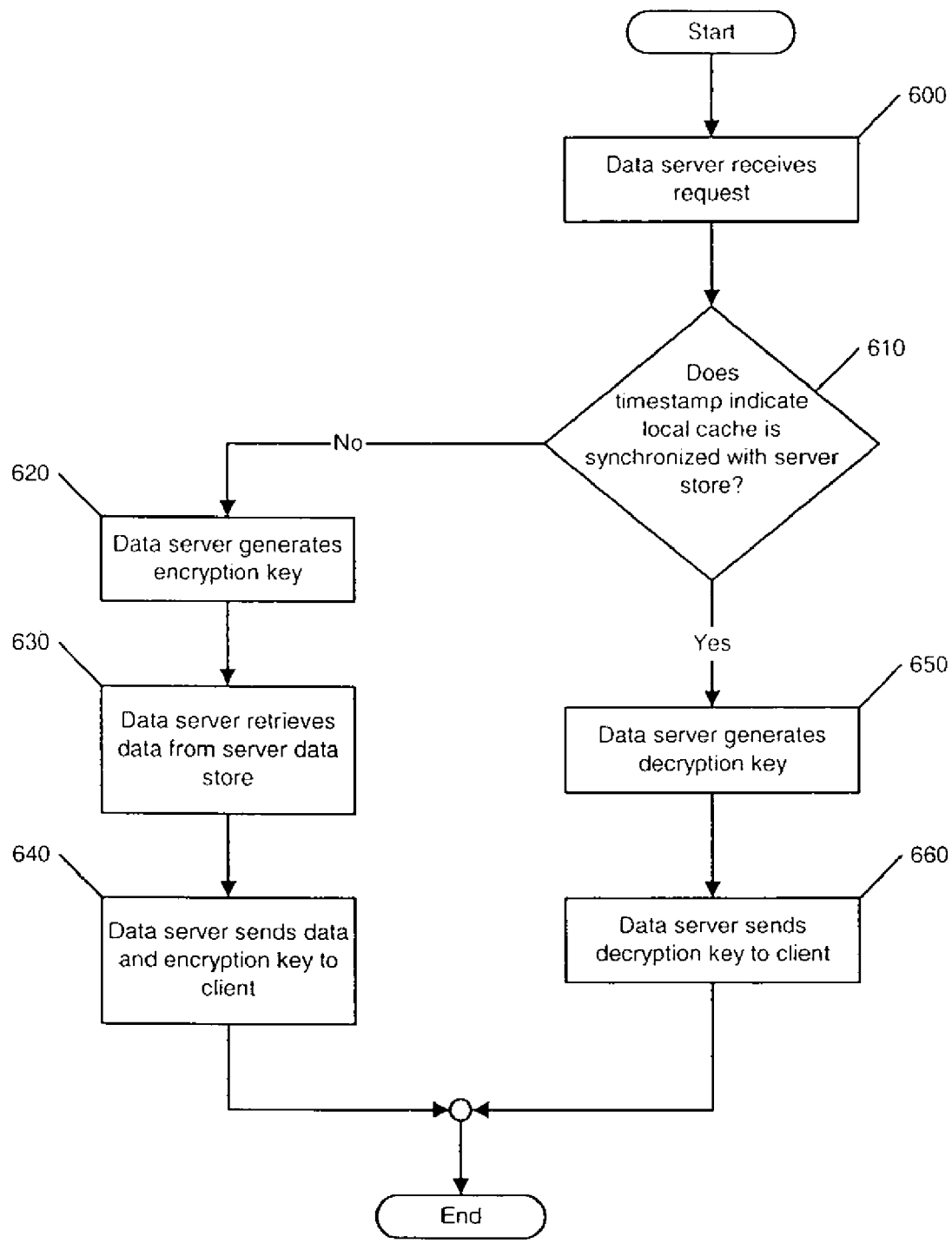
FIG. 6 is a flow diagram illustrating an example of a data server processing a data request from a client, according to embodiments of the present invention.

FIG. 6 is a flow diagram illustrating an example of processing performed by a data server in response to the receipt of a data request from a client according to the present invention. As noted, the ability to take a given action, and so be remotely controlled, based on the synchronization information received provides a great deal of flexibility, as reflected in the flow diagram of FIG. 6. The process begins with the data server's receipt of the client's request for data (step 600). Next, the data server makes a determination as to whether the timestamp received is earlier than the timestamp of the data stored in the data server's server data store (step 610). It will be appreciated that the client is able to control the data server's actions by setting the timestamp sent to the data server appropriately. Thus, by setting the timestamp to a very early point in time, the client can force the data server to download a full set of data, or some subset of the available data.

In the event that such is the case, or the data in the client's local data cache is, in fact, stale, the timestamp received by the data server will be earlier than the timestamp of the data in the data server's server data store. If such is the case, the data server generates an encryption key (step 620). The data server then retrieves the requisite data from its server data store (step 630). Having generated an encryption key and retrieved the requisite data, the data server sends this information to the client (step 640). However, if the timestamp received by the data server indicates that the data stored in the client's local data cache is timely (step 610), the data server simply generates the requisite decryption key (step 650), and sends this decryption key to the client (step 660).

It will be appreciated that the process described in connection with FIG. 6, as the process relates to the analysis of the timestamp, need not necessarily be performed by the data server. In an alternative embodiment, the data server provides its own timestamp information to the client, in response to a request by the client for this information. The client then performs a comparison of the two timestamps, and makes a request for the requisite data, should such data be needed. It will also be appreciated that this allows the client to force the data server to send the requisite data, by simply making a request for the data, regardless of the timestamp received from the data server.

Figure 7:
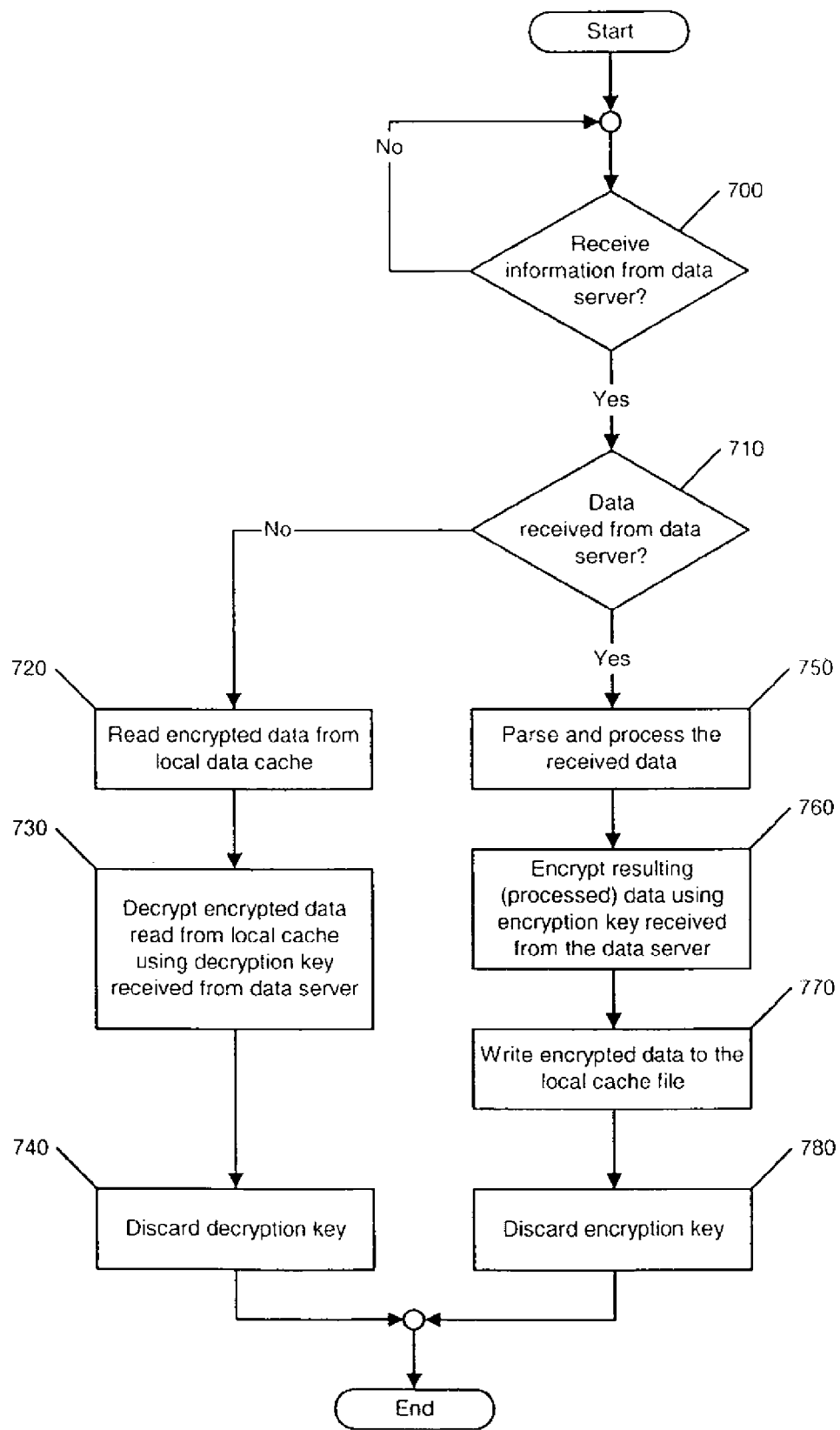
FIG. 7 is a flow diagram illustrating an example of a client receiving information from a data server, according to embodiments of the present invention.

FIG. 7 is a flow diagram illustrating an example of a client receiving information from a data server according to embodiments of the present invention, which reflects the flexibility of this approach, as noted earlier. In this example, the client may receive data and an encryption key, or simply a decryption key, from the data server, depending on the state of the client's local data cache, as reflected in the synchronization information sent to the data server. The process begins with the receipt of the requisite information (step 700). Once the requisite data and encryption key (or the decryption key), are (is) received from the data server, a determination is made as to whether an encryption key and data, or just a decryption key, have been received (step 710). If only a decryption key is received from the data server, the client reads its local data cache (step 720). Now having the requisite encrypted data and decryption key as received from the data server, the client is now able to decrypt the encrypted data read from its local data cache (step 730), and use that decrypted data to populate the page served by the content server. Next, the client discards the decryption key, leaving only the encrypted data stored on the client (step 740).

It will be appreciated that, by maintaining decryption information remotely from the given client, such as in the authentication server's authentication database, the only data that needs to reside on the client is its local data cache's encrypted data. This protects the data encrypted in the local data cache from intrusion by others who may have access to the client, such as in the case of a public computer or the like, as there is no encryption information kept on the client. Moreover, such advantages are achieved with improved performance, through the use of validation information (e.g., the KeyID). The KeyID can be safely stored on the client because the decryption information (the key) cannot be deduced from the KeyID.

If data is received from the data server, along with an encryption key (step 710), the data received is parsed and processed by the client (step 750). The client then uses the encryption key received from the data server to encrypt the resulting data (step 760). Having processed and encrypted the data, the client then writes the encrypted data to the local data cache file (step 770). Next, the client discards the encryption key (step 780). This has the benefits previously outlined with respect to the discarding of the encryption key.

An Example Computing and Network Environment

Figure 8:
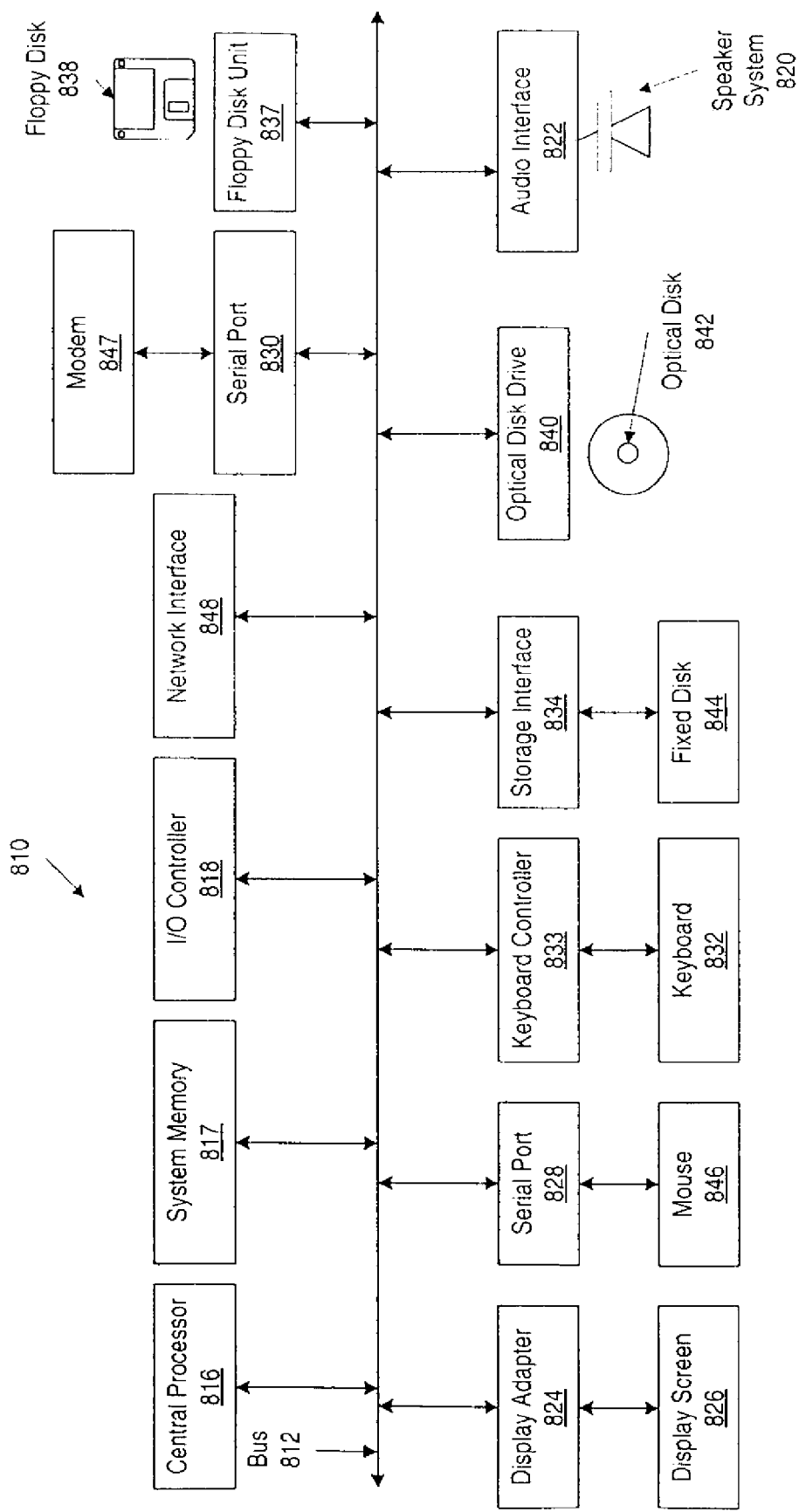
FIG. 8 is a block diagram illustrating an example computer system suitable for implementing the present invention.

FIG. 8 depicts a block diagram of a computer system 810 suitable for implementing a virtual loader according to the present invention. Computer system 810 includes a bus 812 which interconnects major subsystems of computer system 810. These major subsystems can include, for example: a central processor 816; a system memory 817, typically RAM, but which may also include ROM, flash RAM, or the like; an input/output (I/O) controller 818; an external audio device, such as a speaker system 820 via an audio output interface 822; an external device, such as a display screen 824 via display adapter 826; serial ports 828 and 830; a keyboard 832, which is interfaced with a keyboard controller 833; a storage interface 834; a floppy disk unit 837 operative to receive a floppy disk 838; and an optical disk drive 840 operative to receive an optical disk 842. Also typically included are a mouse 1046 or other point-and-click device coupled to bus 1012 via serial port 1028; a modem 1047 coupled to bus 1012 via serial port 1030; and a network interface 1048 coupled directly to bus 1012.

Bus 812 allows data communication between central processor 816 and system memory 817, which may include read-only memory (ROM) or flash memory (neither shown), and random access memory (RAM) (not shown), as previously noted. The RAM is generally the main memory into which the operating system and application programs are loaded and typically affords at least 64 megabytes of memory space. The ROM or flash memory may contain, among other code, the Basic Input-Output system (BIOS) which controls basic hardware operation such as the interaction with peripheral components. Applications resident with computer system 810 are generally stored on and accessed via a computer readable medium, such as a hard-disk drive; a fixed disk 844; an optical drive such as optical disk drive 840; floppy disk unit 837; or other storage medium. Additionally, applications may be in the form of electronic signals modulated in accordance with the application and data communication technology when accessed via network modem 847 or network interface 848.

Storage interface 834, as with the other storage interfaces of computer system 810, may connect to a standard computer readable medium for storage and/or retrieval of information, such as fixed disk drive 844. Fixed disk drive 844 may be a part of computer system 810 or may be separate and accessed through other interface systems. It will be apparent that a virtual loader of the present invention can be implemented, for example, using a hard-disk drive such as fixed disk 844. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems, such as bar code readers, document scanners, digital cameras and so on (not shown), may be connected in a similar manner. Conversely, it is not necessary for all of the devices shown in FIG. 8 to be present to practice the present invention. The devices and subsystems may be interconnected in different ways from that shown in FIG. 8. The operation of a computer system such as that shown in FIG. 8 is readily known in the art and is not discussed in detail in this application. Code to implement the present invention may be stored in computer-readable storage media such as one or more of system memory 817, fixed disk 844, optical disk 842, or floppy disk 838. Additionally, computer system 810 may be any kind of computing device, and so includes personal data assistants (PDAs), network appliance, X-window terminal or other such computing devices. The operating system provided on computer system 810 may be MS-DOS®, MS-WINDOWS®, OS/2®, UNIX®, Linux®, or another known operating system. Computer system 810 also supports a number of Internet access tools, including, for example, an HTTP-compliant web browser having a JavaScript interpreter, such as Netscape Navigator®, Microsoft Explorer®, and the like.

The foregoing described embodiment wherein the different components are contained within different other components, such as the various elements shown as components of computer system 810. It is to be understood that such depicted architectures are merely examples, and that, in fact, many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Moreover, regarding the signals described herein, those skilled in the art will recognize that a signal may be directly transmitted from a first block to a second block, or a signal may be modified, for example by being amplified, attenuated, delayed, latched, buffered, inverted, filtered, or otherwise modified, between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved. For example, there will inevitably be some attenuation and delay in such circuitry. Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
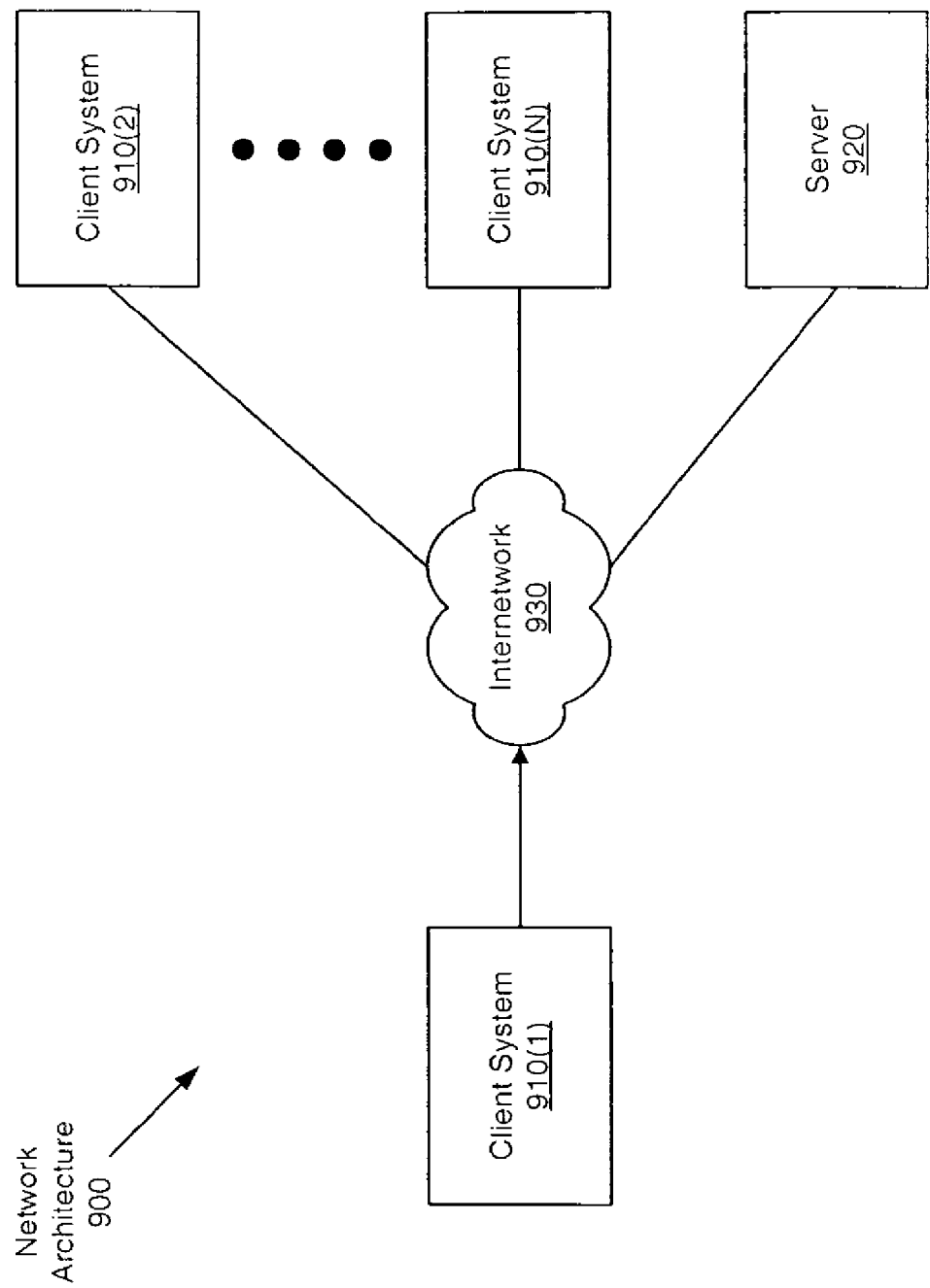
FIG. 9 is a block diagram illustrating a network architecture suitable for implementing the present invention.

FIG. 9 is a block diagram depicting a network architecture 900 in which client systems 910(1)-(N), as well as a server 940 (any of which can be implemented using a computer system such as computer system 810), are coupled to a network 930. With reference to computer system 810, modem 847, network interface 848 or some other method can be used to provide connectivity from each of client computer systems 910(1)-(N) to network 930. Client systems 910(1)-(N) are able to access information on server 920 using, for example, a web browser or other client software (not shown). Such a client allows client systems 910(1)-(N) to access data hosted by server 920. FIG. 9 depicts the use of a network such as the Internet for exchanging data, but the present invention is not limited to the Internet or any particular network-based environment.

Referring to FIGS. 8 and 9, a browser running on computer system 810 employs a TCP/IP connection to pass a request to server 940. Such a browser can run, for example, an HTTP "service" or a "daemon". Such a request can be processed, for example, by contacting an HTTP server employing a protocol that can be used to communicate between the HTTP server and the client computer. The HTTP server then responds to the protocol, typically by sending a "web page" formatted as an HTML file. The browser interprets the HTML file and may form a visual representation of the same using local resources.

It will be noted that the variable identifier "N" is used in several instances in FIG. 9 to more simply designate the final element of a series of related or similar elements. The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Moreover, while the invention has been particularly shown and described with reference to these specific embodiments, it will be understood by those skilled in the art that the foregoing and other changes in the form and details may be made therein without departing from the spirit or scope of the invention.

What is claimed is:

1. A server computer comprising:
an interface in communication with a client computer, wherein said interface is communicatively coupled to a local data cache of the client computer and storing local validation information, said server computer operatively coupled to a data store and comprising a processor configured to examine said local validation information and synchronize said local data cache with said data store if said local validation information indicates that said local data cache is not synchronized with said data store.

2. The server computer of claim 1, wherein the processor is configured to compare said local validation information and current validation information.

3. The server computer of claim 2, wherein said processor is configured to use synchronization information.

4. The server computer of claim 3, wherein said processor is configured to generate said synchronization information, if said local validation information indicates that said local data cache is not synchronized with said data store.

5. The server computer of claim 3, wherein said processor is configured to serve data from said data store in response to receiving said synchronization information.

6. A method, comprising:
comparing, by a client computer, first validation information and second validation information; and
synchronizing, by the client computer, first data stored in a local data cache of a client computer with second data stored in a data store of a server computer, if said comparing indicates said synchronizing is needed.

7. The method of claim 6, further comprising receiving said first validation information.

8. The method of claim 7, wherein said local data cache comprises said second validation information.

9. The method of claim 7, wherein said synchronizing comprises deleting said first data from said local data cache, and writing said second data to said local data cache.

10. The method of claim 7, wherein said synchronizing comprises deleting said local data cache, and writing a new local data cache.

11. The method of claim 7, wherein said receiving said first validation information is performed by the client computer, said client computer is communicatively coupled to said server computer, said synchronizing comprises sending synchronization information to said server computer, and said data store is operably coupled to said server computer.

12. The method of claim 11, further comprising storing said local data cache as a file in a directory structure of said client computer.

13. A computer readable storage medium comprising computer instructions tangibly stored thereon and executed by a processor, the computer instructions comprising:

a first set of instructions, executable by the processor, configured to compare first validation information and second validation information; and a second set of instructions, executable by the processor, configured to synchronize first data stored in a local data cache with second data stored in a data store, if said comparing indicates said synchronizing is needed.

14. The computer readable storage medium of claim 13, further comprising a third set of instructions, executable by the processor, configured to receive said first validation information.

15. The computer readable storage medium of claim 14, wherein said local data cache comprises said second validation information.

16. The computer readable storage medium of claim 14, wherein said second set of instructions comprises, first subset of instructions, executable by the processor, configured to delete said first data from said local data cache; and a second subset of instructions, executable by the processor, configured to write said second data to said local data cache.

* * * * *